(12) United States Patent
Chang et al.

(10) Patent No.: US 10,458,435 B2
(45) Date of Patent: Oct. 29, 2019

(54) VIBRATION DAMPER STRUCTURE AND FAN THEREOF

(71) Applicant: ASIA VITAL COMPONENTS CO., LTD., New Taipei (TW)

(72) Inventors: Bor-Haw Chang, New Taipei (TW); Yu-Tzu Chen, New Taipei (TW); Chung-Shu Wang, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 297 days.

(21) Appl. No.: 15/401,089

(22) Filed: Jan. 8, 2017

(65) Prior Publication Data
US 2018/0195531 A1 Jul. 12, 2018

(51) Int. Cl.
*F04D 29/66* (2006.01)
*F16F 9/54* (2006.01)
*F16F 15/12* (2006.01)
*F04D 25/06* (2006.01)

(52) U.S. Cl.
CPC ......... *F04D 29/668* (2013.01); *F04D 25/062* (2013.01); *F04D 25/0626* (2013.01); *F16F 9/54* (2013.01); *F16F 15/1207* (2013.01)

(58) Field of Classification Search
CPC ...... F04D 29/668; F04D 29/661; F04D 29/66; F04D 25/062; H02K 5/1675; H02K 5/24
See application file for complete search history.

(56) References Cited

U.S. PATENT DOCUMENTS

| 4,612,468 | A | * | 9/1986 | Sturm | H02K 5/1675 310/67 R |
| 4,737,673 | A | * | 4/1988 | Wrobel | F04D 29/057 310/67 R |
| 4,955,791 | A | * | 9/1990 | Wrobel | F04D 29/056 310/67 R |
| 7,674,094 | B2 | * | 3/2010 | Yeh | F04D 29/646 310/90 |
| 2002/0031428 | A1 | * | 3/2002 | Li | F04D 29/059 415/229 |

(Continued)

FOREIGN PATENT DOCUMENTS

CN 1936350 A * 3/2007 ............. F04D 29/04

OTHER PUBLICATIONS

English Translation of Description from CN1936350A (Year: 2007).*

*Primary Examiner* — Dwayne J White
*Assistant Examiner* — Wesley Le Fisher
(74) *Attorney, Agent, or Firm* — Jackson IPG PLLC; Demian K. Jackson (57) ABSTRACT

A vibration damper structure and a fan thereof. The vibration damper structure includes a support body, a fixing seat and an elastic member. The support body has a lower end. The fixing seat has a tubular section. The tubular section has a protrusion end corresponding to the lower end of the support body and a receiving space. The receiving space has a bottom section. The elastic member is disposed in the receiving space of the tubular section and positioned between the support body and the fixing seat. Two ends of the elastic member are respectively in contact with the lower end of the support body and the bottom section of the receiving space. The vibration damper structure is applied to the fan to greatly reduce the vibration of the fan in operation.

12 Claims, 11 Drawing Sheets (56) References Cited

U.S. PATENT DOCUMENTS

| | | | |
|---|---|---|---|
| 2004/0136842 A1* | 7/2004 | Obara | F04D 29/057 417/354 |
| 2007/0013247 A1* | 1/2007 | Tung | F04D 29/0513 310/90 |
| 2010/0266402 A1* | 10/2010 | Chen | F04D 29/059 415/229 |
| 2011/0031832 A1* | 2/2011 | Jia | H02K 5/1675 310/90 |
| 2015/0233444 A1* | 8/2015 | Chang | F04D 29/668 415/119 |

* cited by examiner

VIBRATION DAMPER STRUCTURE AND FAN THEREOF

BACKGROUND OF THE INVENTION

1. Field of the Invention

The present invention relates generally to a vibration damper structure and a fan thereof, and more particularly to a vibration damper structure, which is able to reduce the vibration of the fan in rotation and a fan with the vibration damper structure.

2. Description of the Related Art

In the flourishing development of current information technique, a mass of information data needs to be calculated, integrated, transmitted and stored. In order to deal with such a huge data technique, the server base station comes with the tide of fashion. According to different calculation abilities, the servers can be classified into work-group-grade server, department-grade server and enterprise-grade server.

With the server as hardware, generally the server means those computers with higher calculation ability and capable of providing service for multiple subscribers. In comparison with a common PC, the server needs to work continuously, 24/7. This means that the server requires a more stable technique to ensure data transmission.

The disk drive in the server will detect the magnitude of the vibration and feed back to the reading/writing head so as to control the reading/writing head and ensure the trueness of reading/writing. Under such circumstance, the reading/writing speed will be affected. In order to achieve the highest reading/writing efficiency, the storage device manufacturers and/or server manufacturers often evaluate the magnitude of the vibration of the hard disk on the basis of the rotation vibration (RV) of the hard disk. In general, in order to raise the reading/writing efficiency, not only the structural characteristic of the hard disk itself is actively enhanced, but also a cushion pad or vibration damping material is passively added to minimize affect of the vibration to the hard disk.

Another vibration source is the cooling fan disposed in the server for dissipating the heat. The respective fan manufacturers also have actively improved the efficiency of the motor and the fan blades to lower the transmission of the vibration to the hard disk. Alternatively, a cushion pad or vibration damping material is passively added onto the fan support so as to reduce the vibration caused by the fan and enhance the reading/writing efficiency of the hard disk. However, as a whole, the effect is still limited. For example, while reducing the vibration, the heat dissipation ability may be sacrificed or the additional mechanical component may lead to increase of the cost.

It is therefore tried by the applicant to provide a vibration damper structure and a fan with the vibration damper structure to solve the above problems of the conventional fan.

SUMMARY OF THE INVENTION

It is therefore a primary object of the present invention to provide a vibration damper structure, which is able to reduce the vibration of the fan in operation.

It is a further object of the present invention to provide a fan with the vibration damper structure.

To achieve the above and other objects, the vibration damper structure of the present invention is applied to a fan having at least one bearing. The vibration damper structure includes a support body, a fixing seat and an elastic member. The support body has an upper end and a lower end. The upper end supports the bearing. The fixing seat has a tubular section and a fixing section. The tubular section has a protrusion end corresponding to the lower end of the support body and a receiving space. The receiving space has a bottom section. The fixing section is disposed on an outer circumference of the tubular section. The elastic member is disposed in the receiving space of the tubular section and positioned between the support body and the fixing seat. The elastic member has a first support end in contact with the lower end of the support body and a second support end in contact with the bottom section of the receiving space.

Still to achieve the above and other objects, the fan of the present invention includes a frame body, a stator assembly, a rotor assembly, a support body, a fixing seat and an elastic member. The frame body has a first opening and a second opening. A base seat is disposed at the second opening. A bearing cup and a connection section are disposed on the base seat. At least one bearing is disposed in the bearing cup. The stator assembly is fitted around the bearing cup corresponding to the rotor assembly. The rotor assembly has a shaft inserted into the bearing cup through the bearing. The support body is disposed in the bearing cup under the bearing. The support body has an upper end and a lower end. The upper end supports the bearing. The fixing seat is disposed in the bearing cup. The fixing seat has a tubular section and a fixing section. The tubular section has a protrusion end corresponding to the lower end of the support body and a receiving space. The receiving space has a bottom section. The fixing section is disposed on an outer circumference of the tubular section and mated and connected with the connection section. The elastic member is disposed in the receiving space of the tubular section and positioned between the support body and the fixing seat. The elastic member has a first support end in contact with the lower end of the support body and a second support end in contact with the bottom section of the receiving space.

In the above fan, the lower end is formed with a stepped section and a restriction section. The stepped section is fitted in the protrusion end. The restriction section is formed on an outer circumference of the stepped section corresponding to the protrusion end. The protrusion end defines an inner diameter larger than an outer diameter of the stepped section. An axial cushion gap is defined between the protrusion end and the restriction section. The elastic member is selected from a group consisting of a hydraulic damper, a pneumatic damper or a spring damper.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
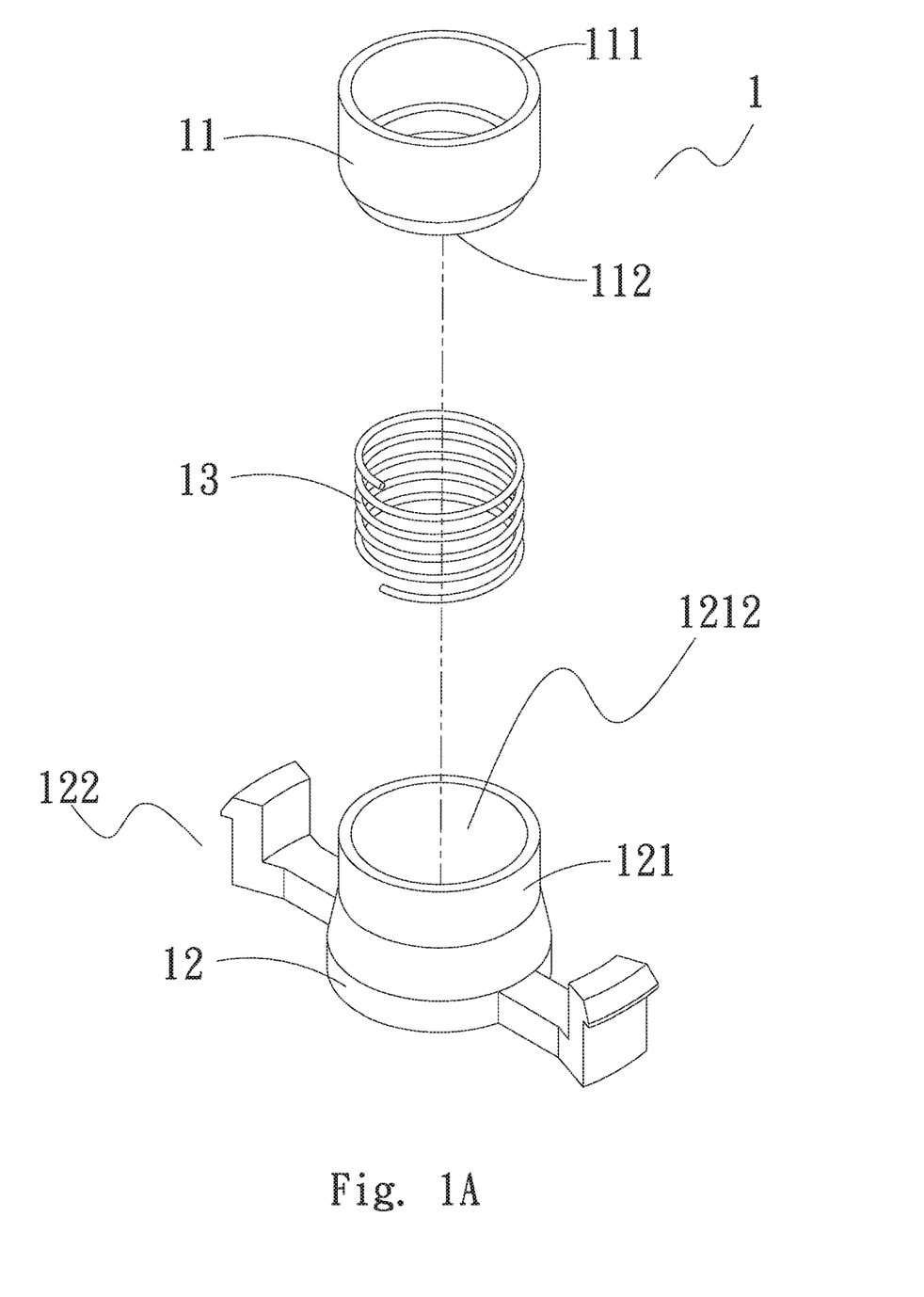
FIG. 1A is a perspective exploded view of the vibration damper structure of the present invention.
Figure 1B:
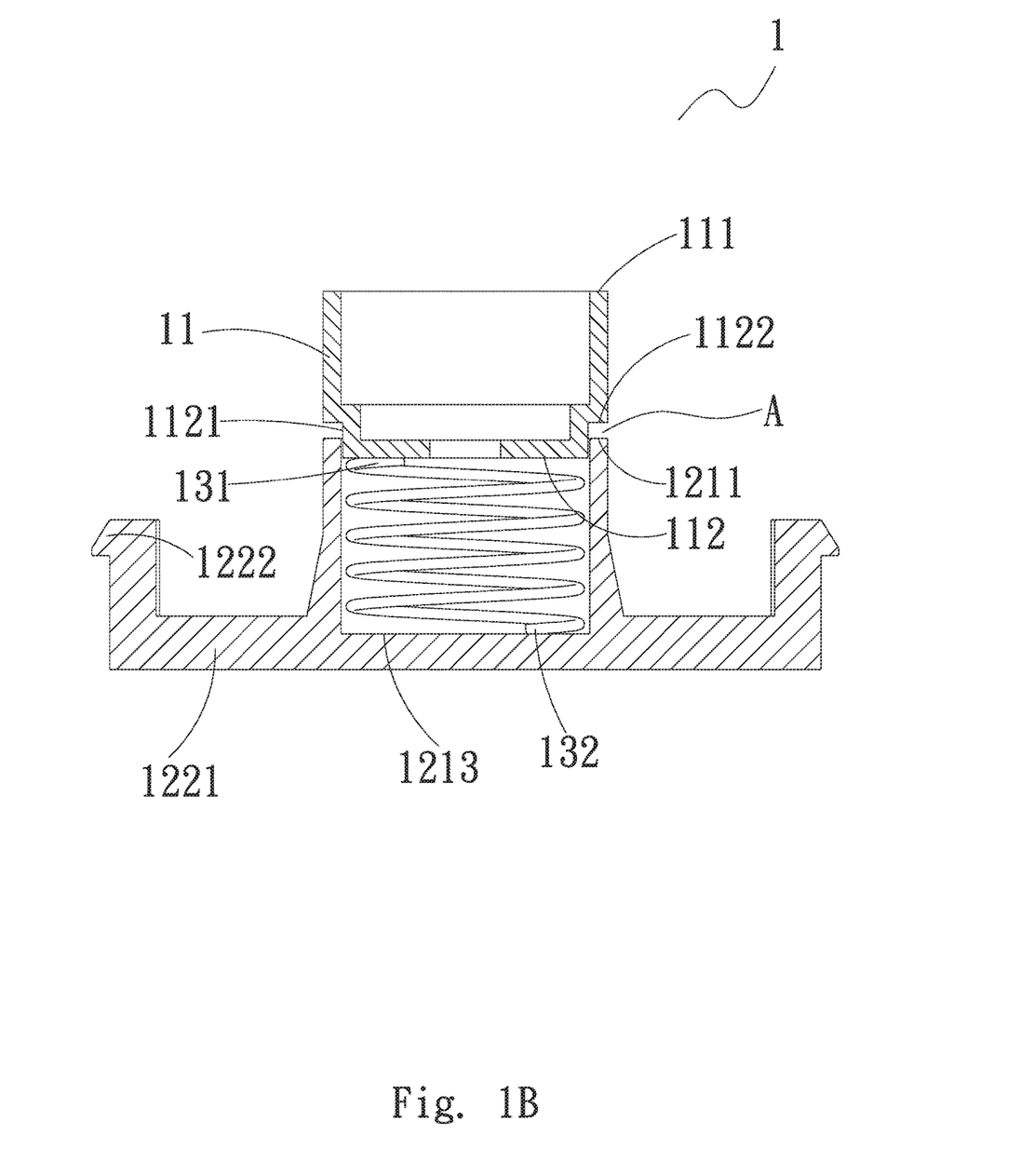
FIG. 1B is a sectional assembled view of the vibration damper structure of the present invention.
Figure 2A:
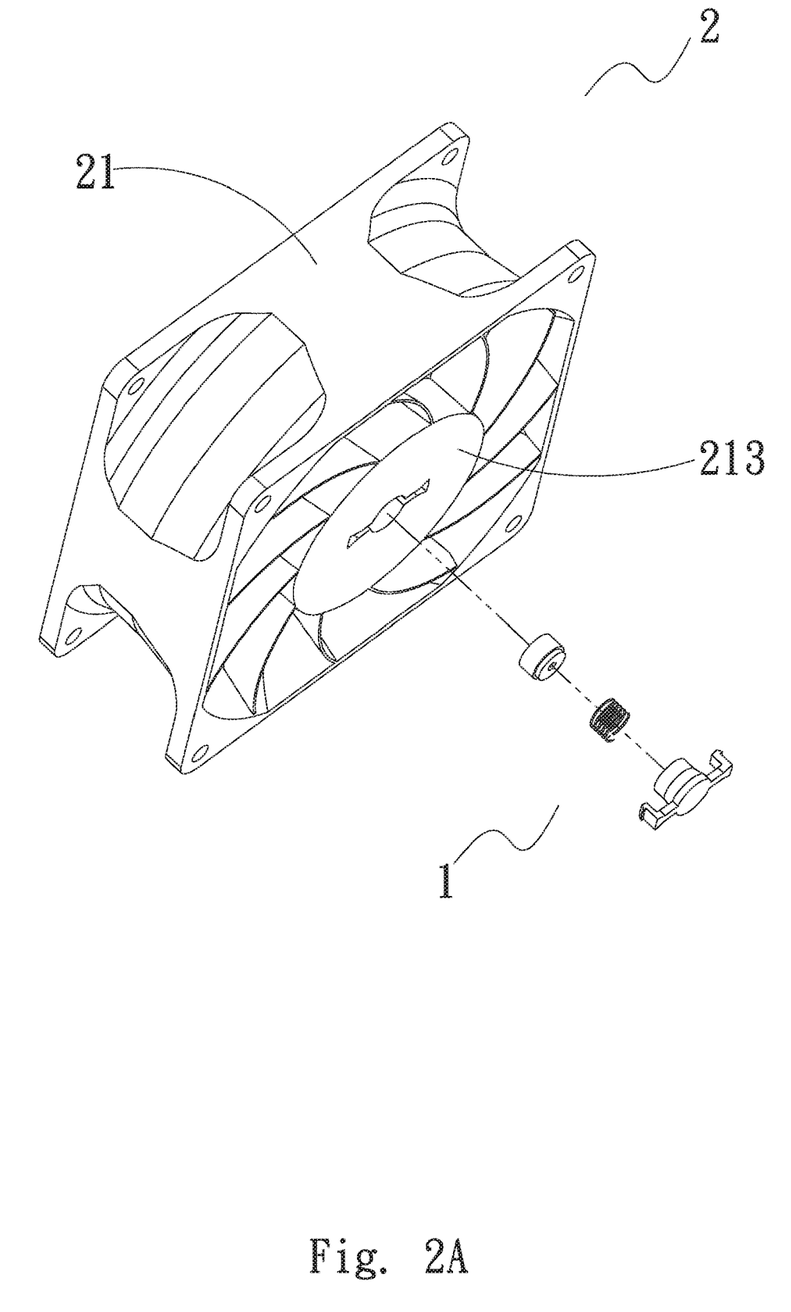
FIG. 2A is a perspective exploded view of the fan of the present invention.
Figure 2B:
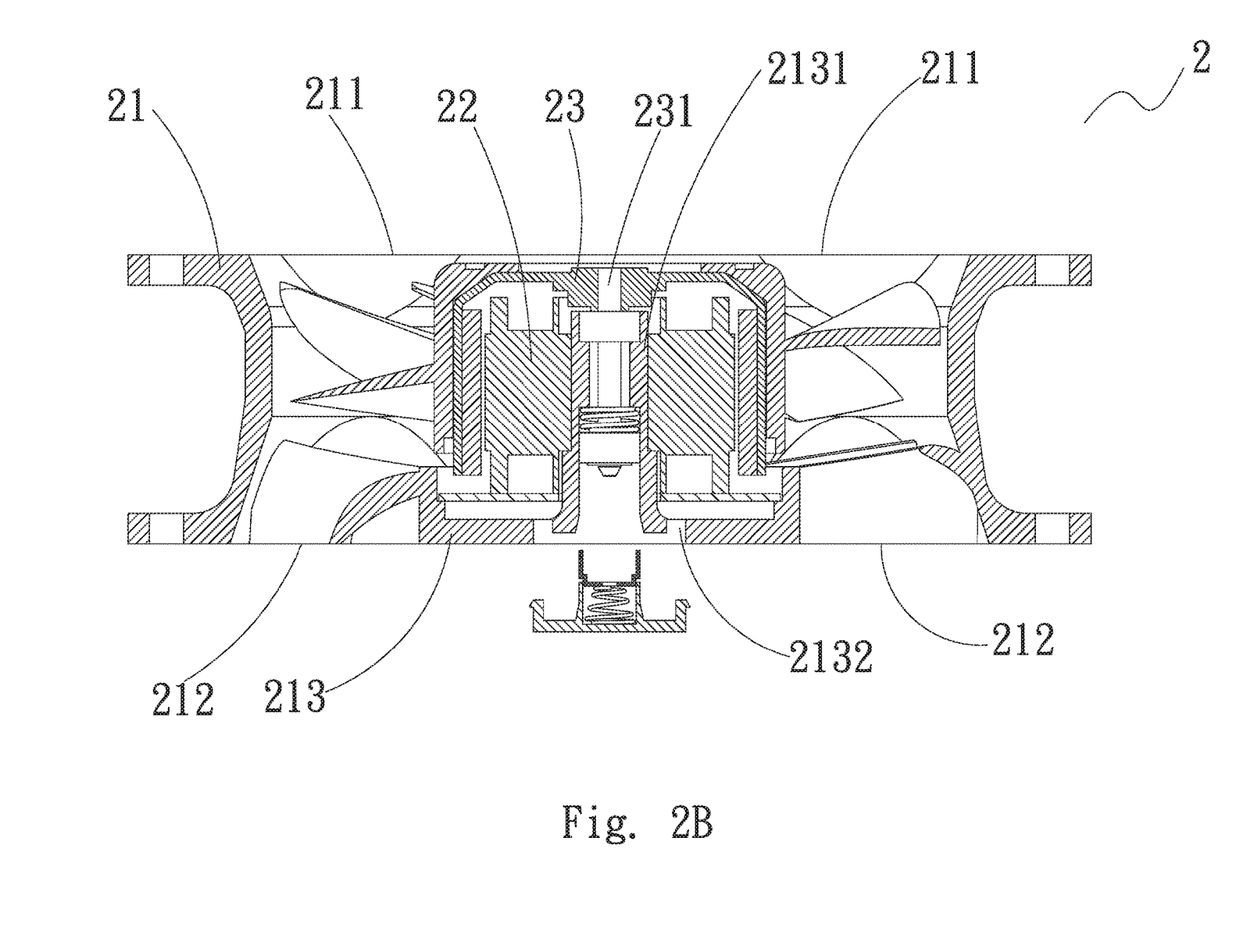
FIG. 2B is a sectional exploded view of the fan of the present invention.
Figure 2C:
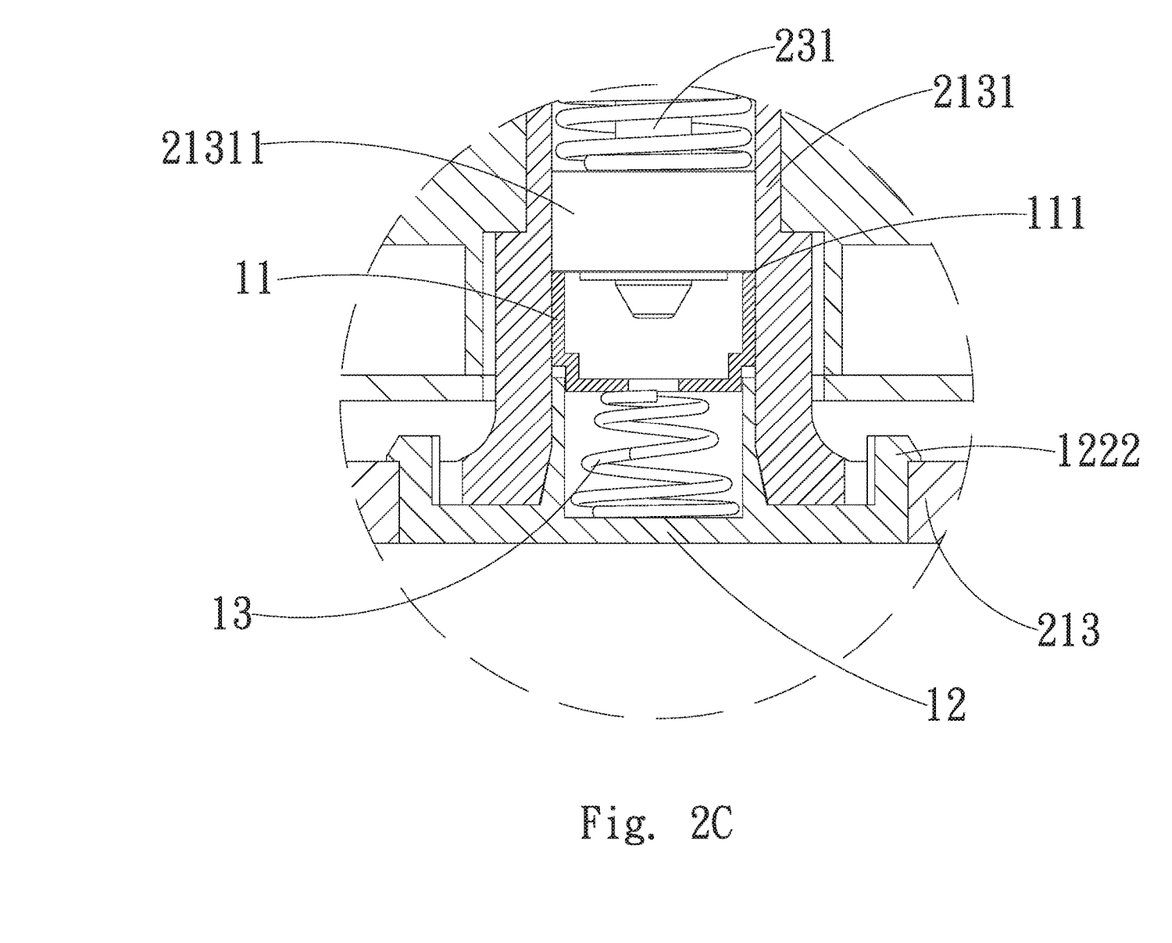
FIG. 2C is an enlarged sectional assembled view of a part of the fan of the present invention.
Figure 3A:
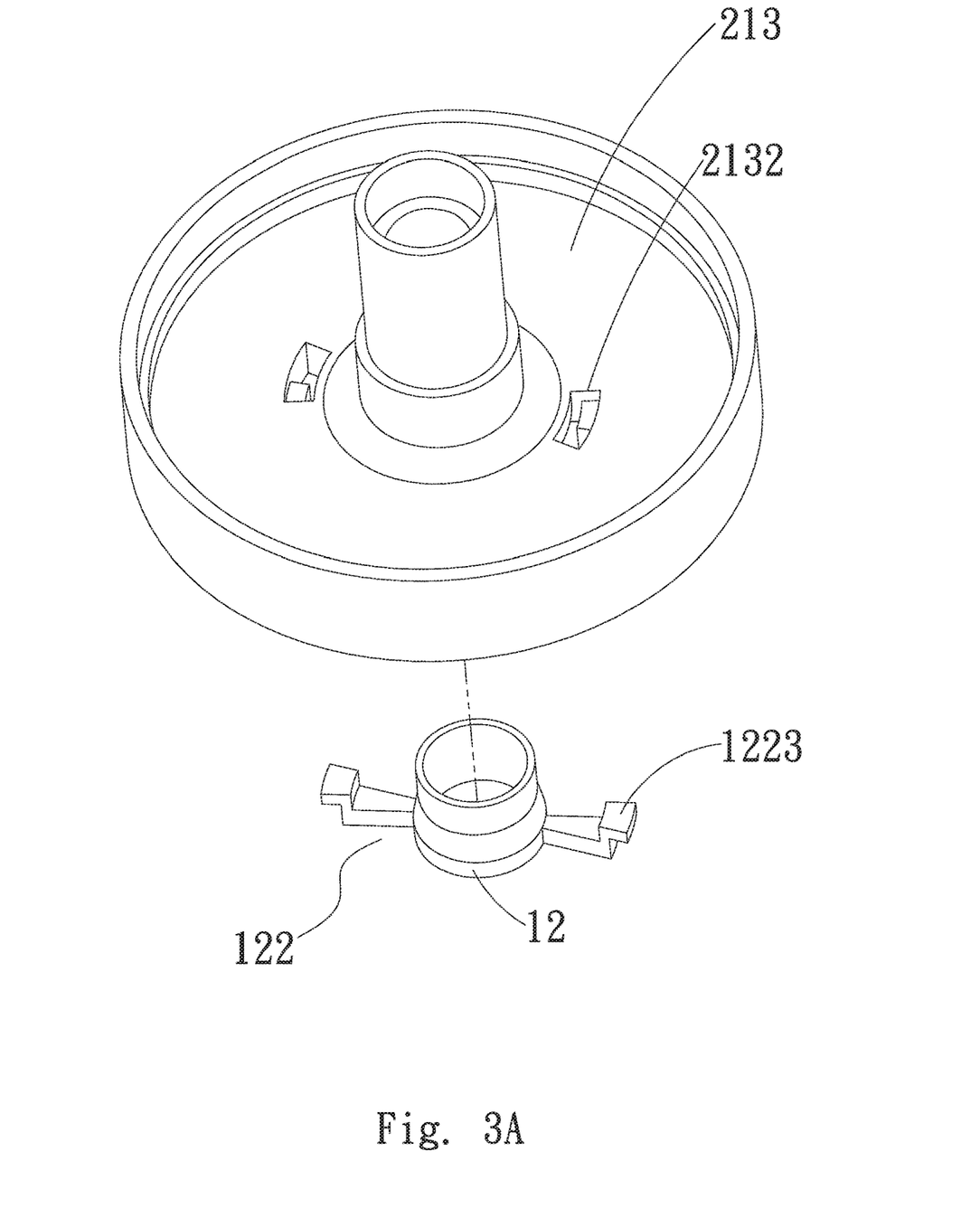
FIG. 3A is a perspective exploded view of another embodiment of the base seat and fixing seat of the present invention.
Figure 3B:
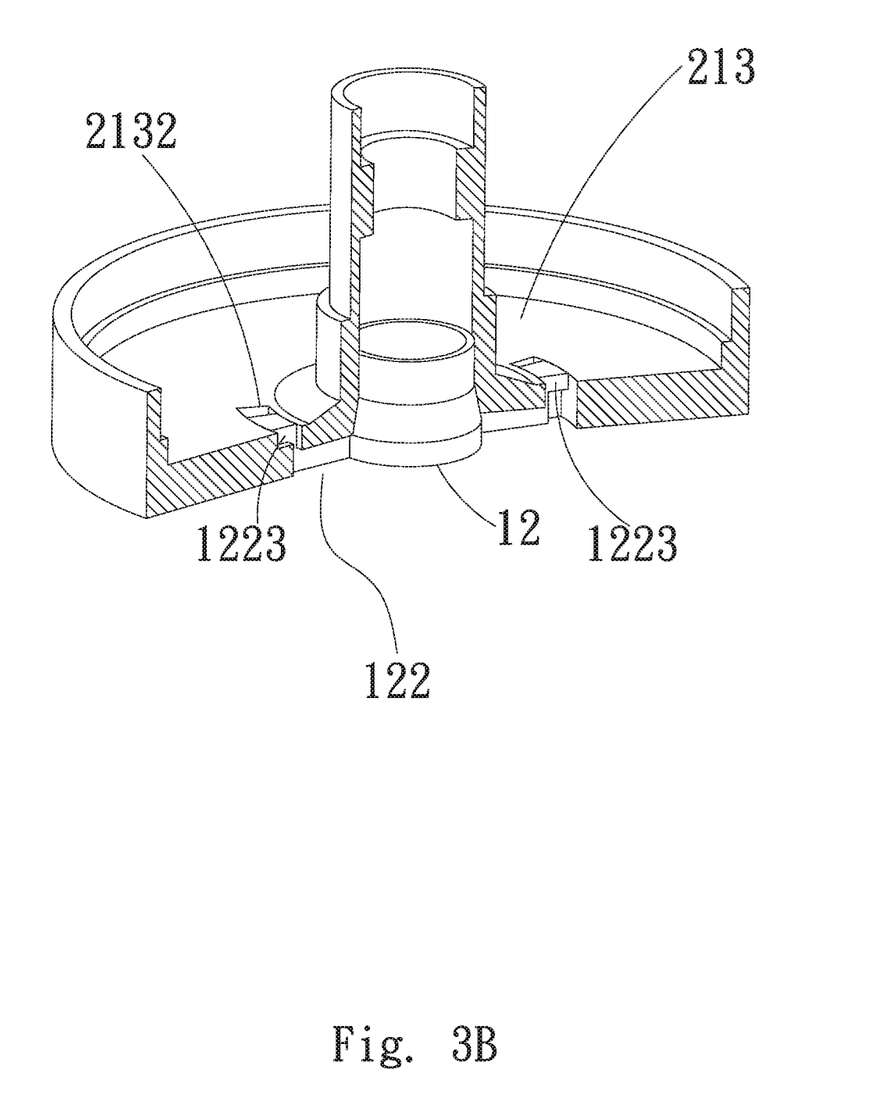
FIG. 3B is a sectional assembled view of the other embodiment of the base seat and fixing seat of the present invention.
Figure 4A:
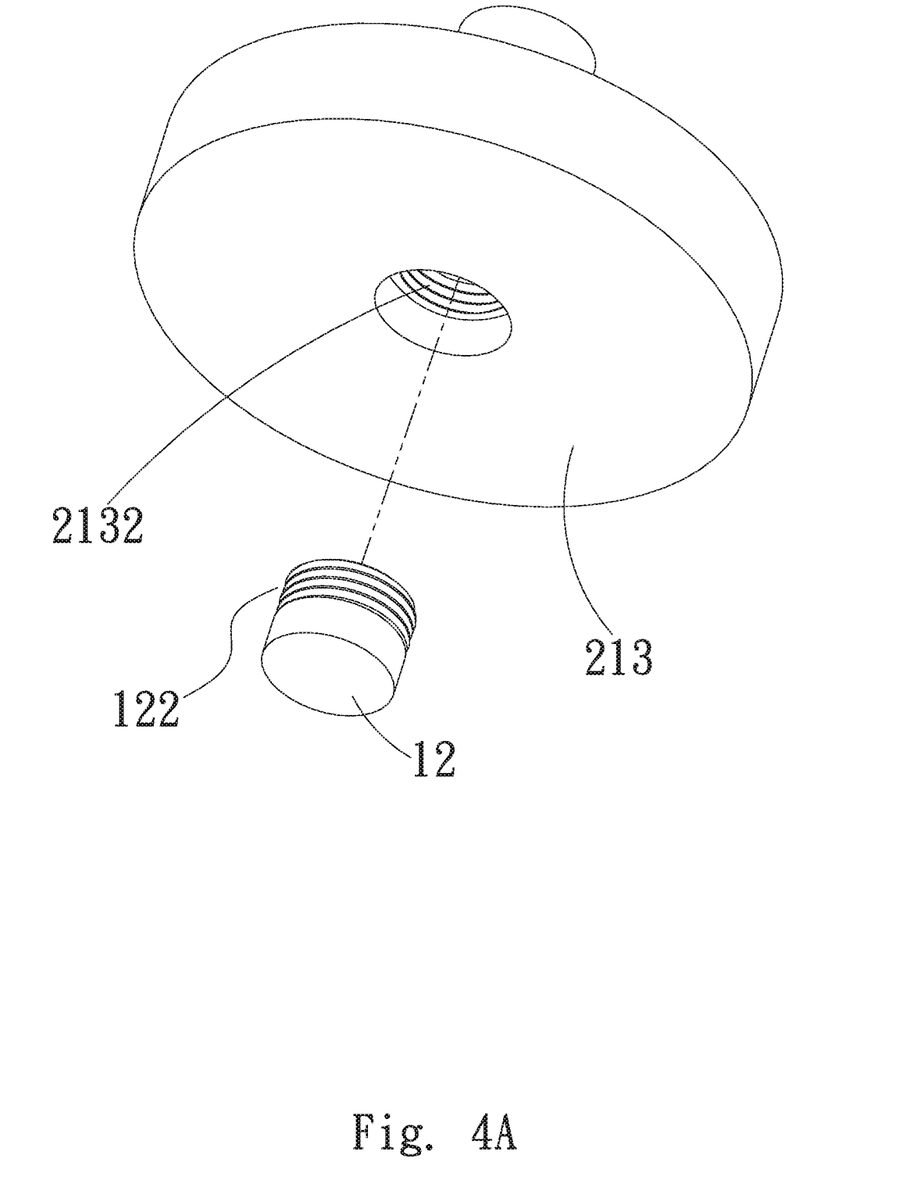
FIG. 4A is a perspective exploded view of still another embodiment of the base seat and fixing seat of the present invention.
Figure 4B:
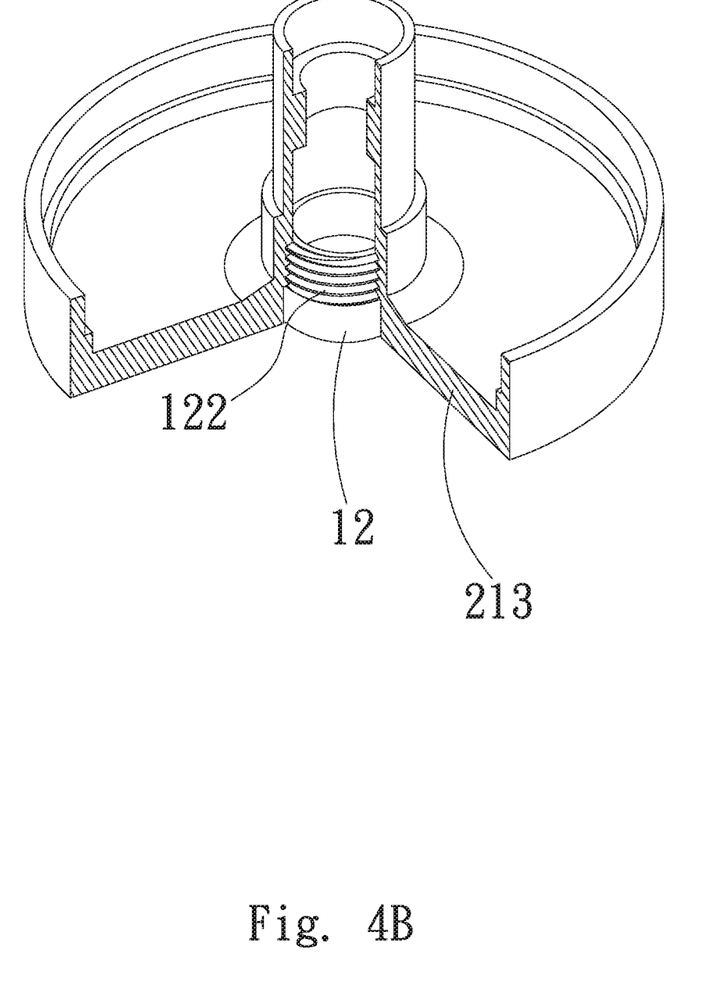
FIG. 4B is a sectional assembled view of still the other embodiment of the base seat and fixing seat of the present invention.
Figure 5A:
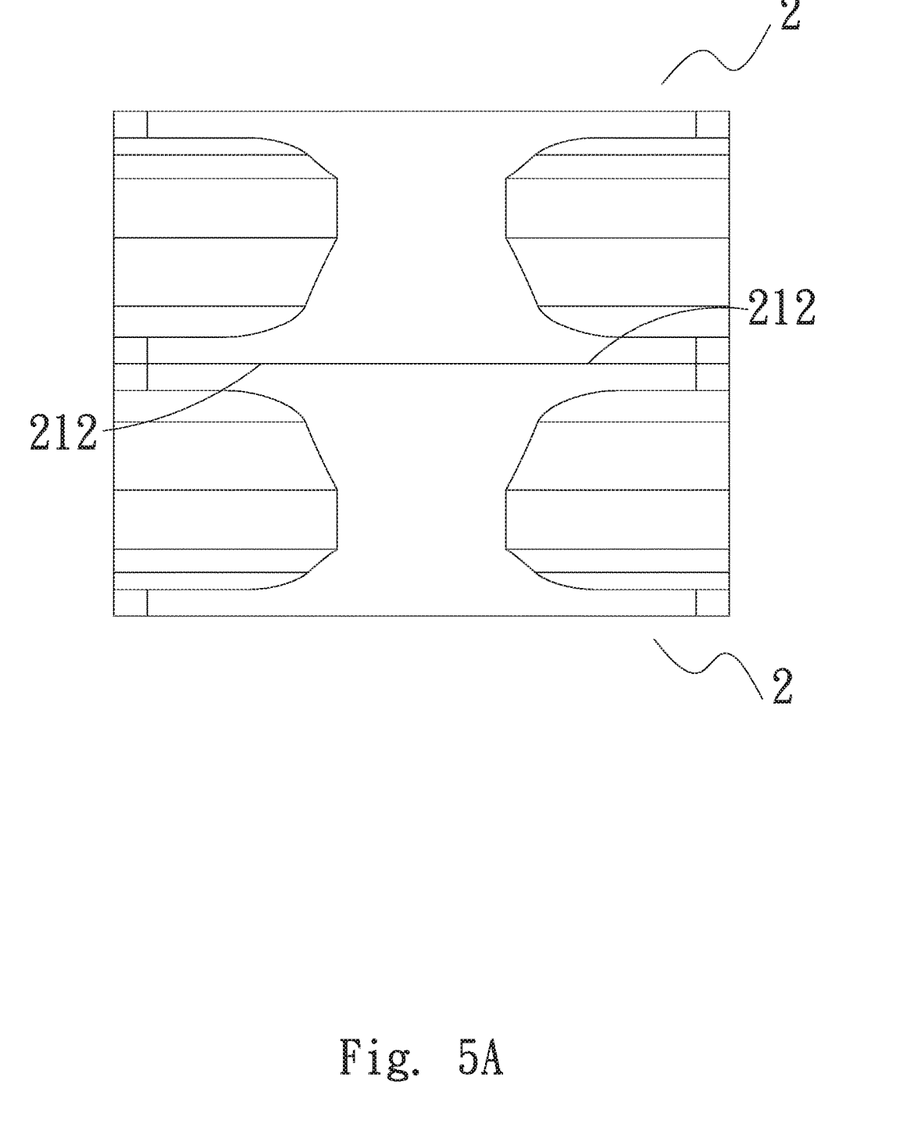
FIG. 5A is a front assembled view of the series fan of the present invention.

FIG. 1A is a perspective exploded view of the vibration damper structure of the present invention. FIG. 1B is a sectional assembled view of the vibration damper structure of the present invention. FIG. 2A is a perspective exploded view of the fan of the present invention. FIG. 2B is a sectional exploded view of the fan of the present invention. FIG. 2C is an enlarged sectional assembled view of a part of the fan of the present invention. FIG. 3A is a perspective exploded view of another embodiment of the base seat and fixing seat of the present invention. FIG. 3B is a sectional assembled view of the other embodiment of the base seat and fixing seat of the present invention. FIG. 4A is a perspective exploded view of still another embodiment of the base seat and fixing seat of the present invention. FIG. 4B is a sectional assembled view of still the other embodiment of the base seat and fixing seat of the present invention. FIG. 5A is a front assembled view of the series fan of the present invention. FIG. 5A is a partially sectional view of the series fan of the present invention.

Please refer to FIGS. 1A and 1B. The vibration damper structure 1 of the present invention includes a support body 11, a fixing seat 12 and an elastic member 13. The support body 11 has an upper end 111 and a lower end 112 opposite to the upper end 111. The lower end 112 is formed with a stepped section 1121 and a restriction section 1122. The stepped section 1121 is an inward recessed structure, while the restriction section 1122 is a stop wall.

The fixing seat 12 has a tubular section 121 and a fixing section 122. The tubular section 121 is formed in an axial direction of the fixing seat 12. The tubular section 121 has a protrusion end 1211 and a receiving space 1212. The receiving space 1212 has a bottom section 1213 defined inside. The fixing section 122 has an extension arm 1221. The extension arm 1221 radially extends from an outer circumference of the tubular section 121 to form a free end. The free end is formed with an insertion buckle 1222.

The elastic member 13 is positioned between the support body 11 and the fixing seat 12 and disposed in the receiving space 1212. The elastic member 13 has a first support end 131 and a second support end 132. The first support end 131 contacts the lower end 112 of the support body 11. The second support end 132 contacts the bottom section 1213 of the receiving space 1212. The elastic member 13 is such as, but not limited to, a hydraulic damper, a pneumatic damper or a spring damper.

The stepped section 1121 is fitted in the protrusion end 1211. The restriction section 1122 is formed on outer circumference of the stepped section 1121 corresponding to the protrusion end 1211. The protrusion end 1211 defines an inner diameter larger than an outer diameter of the stepped section 1121, whereby the stepped section 1121 is axially movable within the tubular section 121. When the elastic member 13 is in a not forced state, an axial cushion gap A is defined between the protrusion end 1211 and the restriction section 1122. When the elastic member 13 is in a forced state, the axial cushion gap A is shortened and the protrusion end 1211 and the restriction section 1122 will contact each other. The length of the axial cushion gap A can be set according to the requirement of use.

Please now refer to FIGS. 2A to 2C and supplementally refer to FIGS. 1A and 1B. The above vibration damper structure 1 is applied to the fan 2 of the present invention. The fan 2 includes a frame body 21, a stator assembly 22 and a rotor assembly 23. The frame body 21 has a first opening 211 and a second opening 212. A base seat 213 is disposed at the second opening 212. A bearing cup 2131 and a connection section 2132 are disposed on the base seat 213. At least one bearing 21311 is disposed in the bearing cup 2131. The stator assembly 22 is fitted around the bearing cup 2131 corresponding to the rotor assembly 23. The rotor assembly 23 has a shaft 231 inserted into the bearing cup 2131 through the bearing 21311.

The support body 11 is disposed in the bearing cup 2131 under the bearing 21311. The upper end 111 supports the bearing 21311. The fixing seat 12 is connected with the base seat 213. In this embodiment, the free end is an insertion buckle 1222. The connection section 2132 is a socket corresponding to the insertion buckle 1222. Accordingly, when the rotor assembly 23 operates to cause vibration, the vibration is transmitted from the bearing 21311 to the support body 111 and the elastic member 13, which absorbs the vibration.

Please now refer to FIGS. 3A and 3B. The entire structure of this embodiment is substantially identical to the above embodiment and thus will not be repeatedly described hereinafter. This embodiment is different from the above embodiment in that the free end of the fixing section 122 is formed as a rotary buckle 1223. The connection section 2132 is an engagement socket corresponding to the rotary buckle 1223. By means of the complementary structures of the rotary buckle 1223 and the engagement socket, the fixing seat 12 and the base seat 213 can be securely connected with each other.

Please now refer to FIGS. 4A and 4B. The entire structure of this embodiment is substantially identical to the above embodiment and thus will not be repeatedly described hereinafter. This embodiment is different from the above embodiment in that the fixing section 122 is an outer thread, while the connection section 2132 is an inner thread corresponding to the outer thread. By means of the complementary structures of the outer thread and inner thread, the fixing seat 12 and the base seat 213 can be securely connected with each other.

Figure 5B:
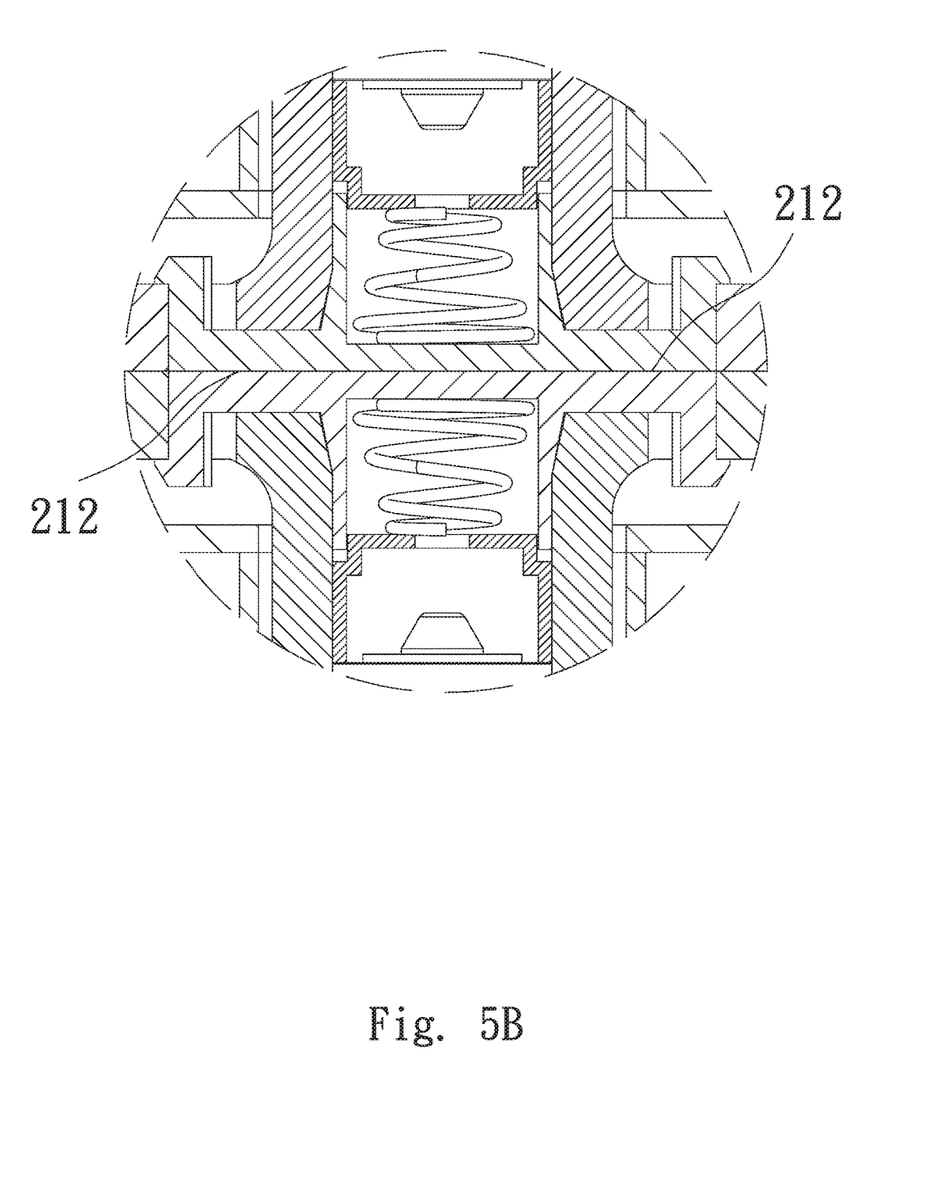
FIG. 5B is a partially sectional view of the series fan of the present invention.

Please now refer to FIGS. 5A and 5B and supplementally refer to FIGS. 2A, 2B and 2C. The second openings 212 of two fans 2 are mated and fixed with each other to form a series fan. When the fans 2 vibrate, the vibration damper structures 1 in the respective fans 2 will absorb the vibration to achieve the same object of vibration damping.

In conclusion, in comparison with the conventional cooling fan, the present invention has the following advantages:

1. The present invention has very good vibration absorption effect.
2. The present invention has diversified fixing structures.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A vibration damper structure applied to a fan having at least one bearing, the vibration damper structure comprising:
   a support body having an upper end supporting the bearing and a lower end formed with a stepped section and a restriction section formed on an outer circumference of the stepped section;
   a fixing seat having a tubular section and a fixing section disposed on an outer circumference of the tubular section, the tubular section having a protrusion end corresponding to the outer circumference of the stepped section and defining an axial cushion gap with the restriction section and a receiving space having a bottom section, where the stepped section is fitted in the protrusion end; and
   an elastic member disposed in the receiving space of the tubular section and positioned between the support body and the fixing seat, the elastic member having a first support end in contact with the lower end of the support body and a second support end in contact with the bottom section of the receiving space.

2. The vibration damper structure as claimed in claim 1, wherein the protrusion end defines an inner diameter larger than an outer diameter of the stepped section.

3. The vibration damper structure as claimed in claim 1, wherein the elastic member is selected from a group consisting of a hydraulic damper, a pneumatic damper or a spring damper.

4. The vibration damper structure as claimed in claim 1, wherein the fixing section has an extension arm, the extension arm radially extending from the outer circumference of the tubular section to form a free end, the free end being formed with an insertion buckle.

5. The vibration damper structure as claimed in claim 1, wherein the fixing section has an extension arm, the extension arm radially extending from the outer circumference of the tubular section to form a free end, the free end being formed with a rotary buckle.

6. The vibration damper structure as claimed in claim 1, wherein the fixing section is an outer thread.

7. A fan comprising:
   a frame body having a first opening and a second opening, a base seat being disposed at the second opening, a bearing cup and a connection section being disposed on the base seat, at least one bearing being disposed in the bearing cup;
   a stator assembly fitted around the bearing cup;
   a rotor assembly corresponding to the stator assembly, the rotor assembly having a shaft inserted into the bearing cup through the bearing; and
   a vibration damper structure including:
      a support body disposed in the bearing cup under the bearing, the support body having an upper end supporting the bearing and a lower end formed with a stepped section and a restriction section formed on an outer circumference of the stepped section;
      a fixing seat having a tubular section and a fixing section disposed on an outer circumference of the tubular section, the tubular section having a protrusion end corresponding to the outer circumference of the stepped section and defining an axial cushion gap with the restriction section and a receiving space having a bottom section, where the stepped section is fitted in the protrusion end; and
      an elastic member disposed in the receiving space of the tubular section and positioned between the support body and the fixing seat, the elastic member having a first support end in contact with the lower end of the support body and a second support end in contact with the bottom section of the receiving space.

8. The fan as claimed in claim 7, wherein the protrusion end defines an inner diameter larger than an outer diameter of the stepped section.

9. The fan as claimed in claim 7, wherein the elastic member is selected from a group consisting of a hydraulic damper, a pneumatic damper or a spring damper.

10. The fan as claimed in claim 7, wherein the fixing section has an extension arm, the extension arm radially extending from the outer circumference of the tubular section to form a free end, the free end being formed with an insertion buckle, the connection section being formed as a socket.

11. The fan as claimed in claim 7, wherein the fixing section has an extension arm, the extension arm radially extending from the outer circumference of the tubular section to form a free end, the free end being formed with a rotary buckle, the connection section being formed as an engagement socket.

12. The fan as claimed in claim 7, wherein the fixing section is an outer thread and the connection section is an inner thread.

* * * * *